A. T. HUNT.
PROCESS OF AND APPARATUS FOR CUTTING DIAMONDS.
APPLICATION FILED AUG. 10, 1916.
1,284,109.
Patented Nov. 5, 1918.
8 SHEETS—SHEET 8.
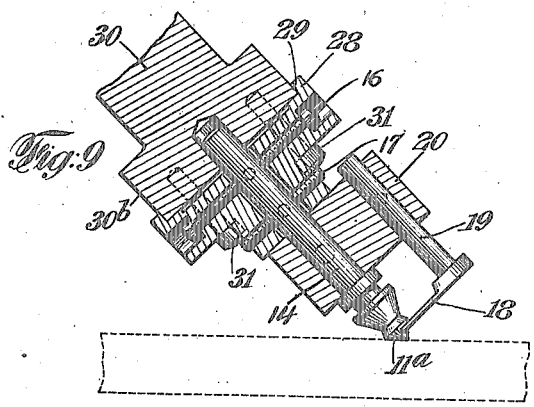
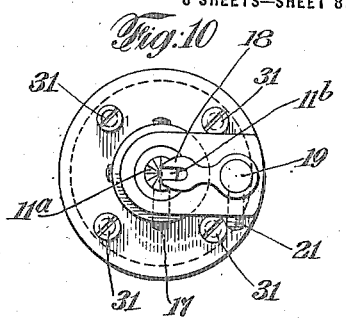
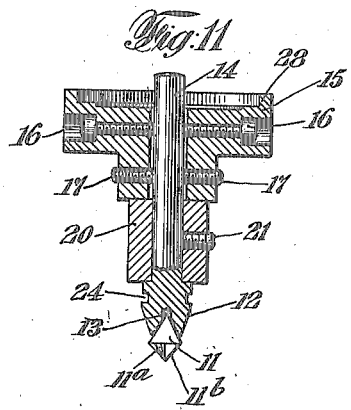
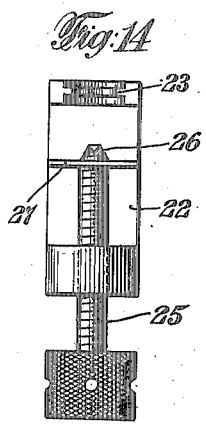
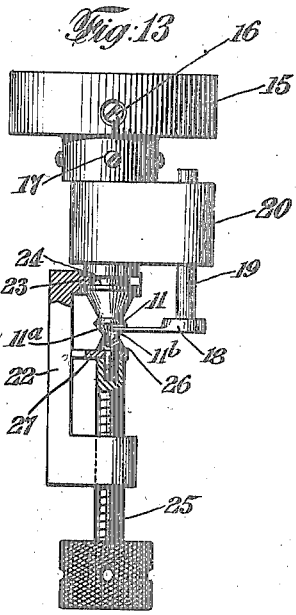
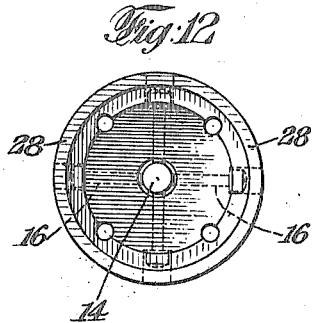
Inventor
Alfred T. Hunt,
By his Attorneys
Prindle, Wright & Small

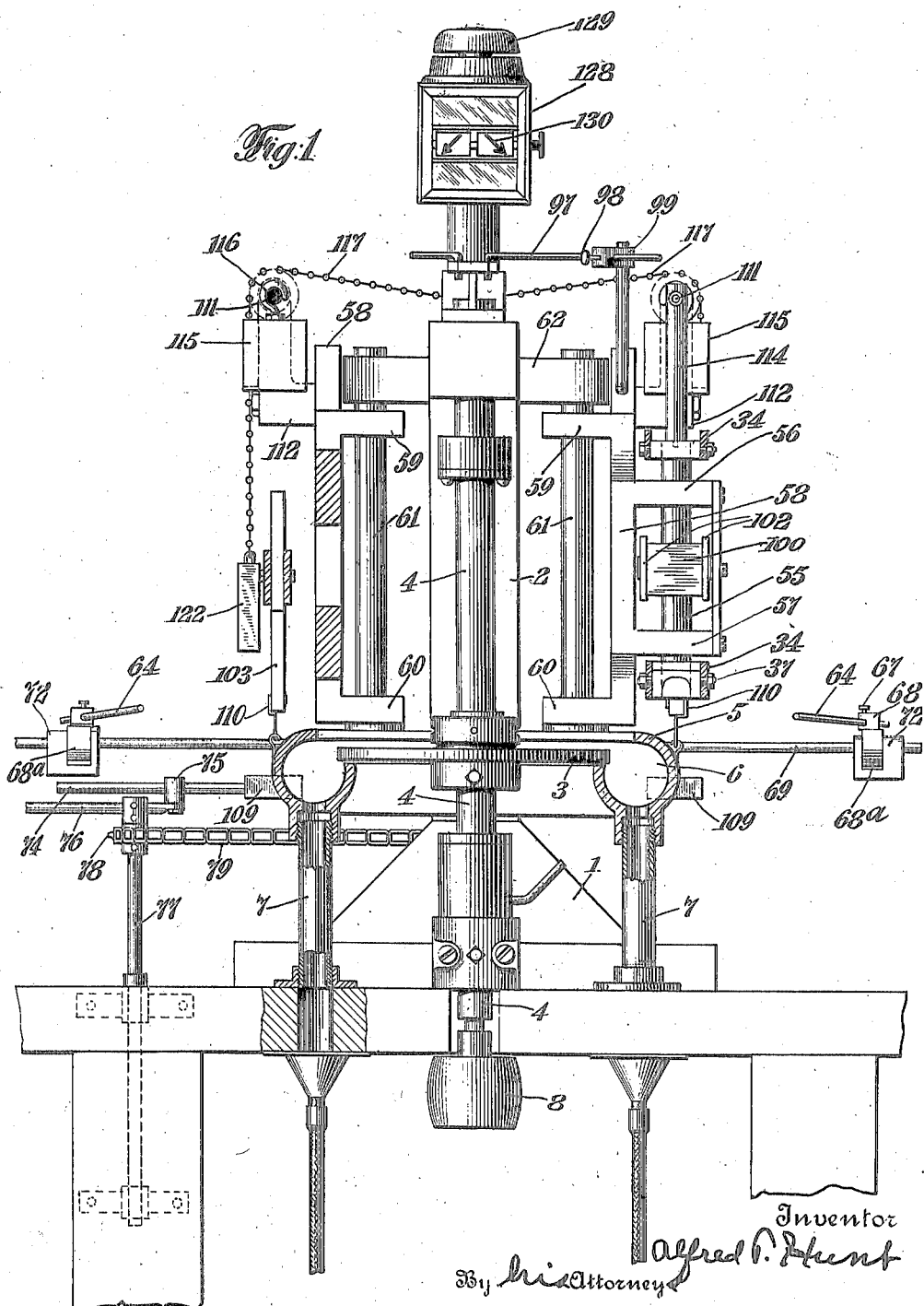

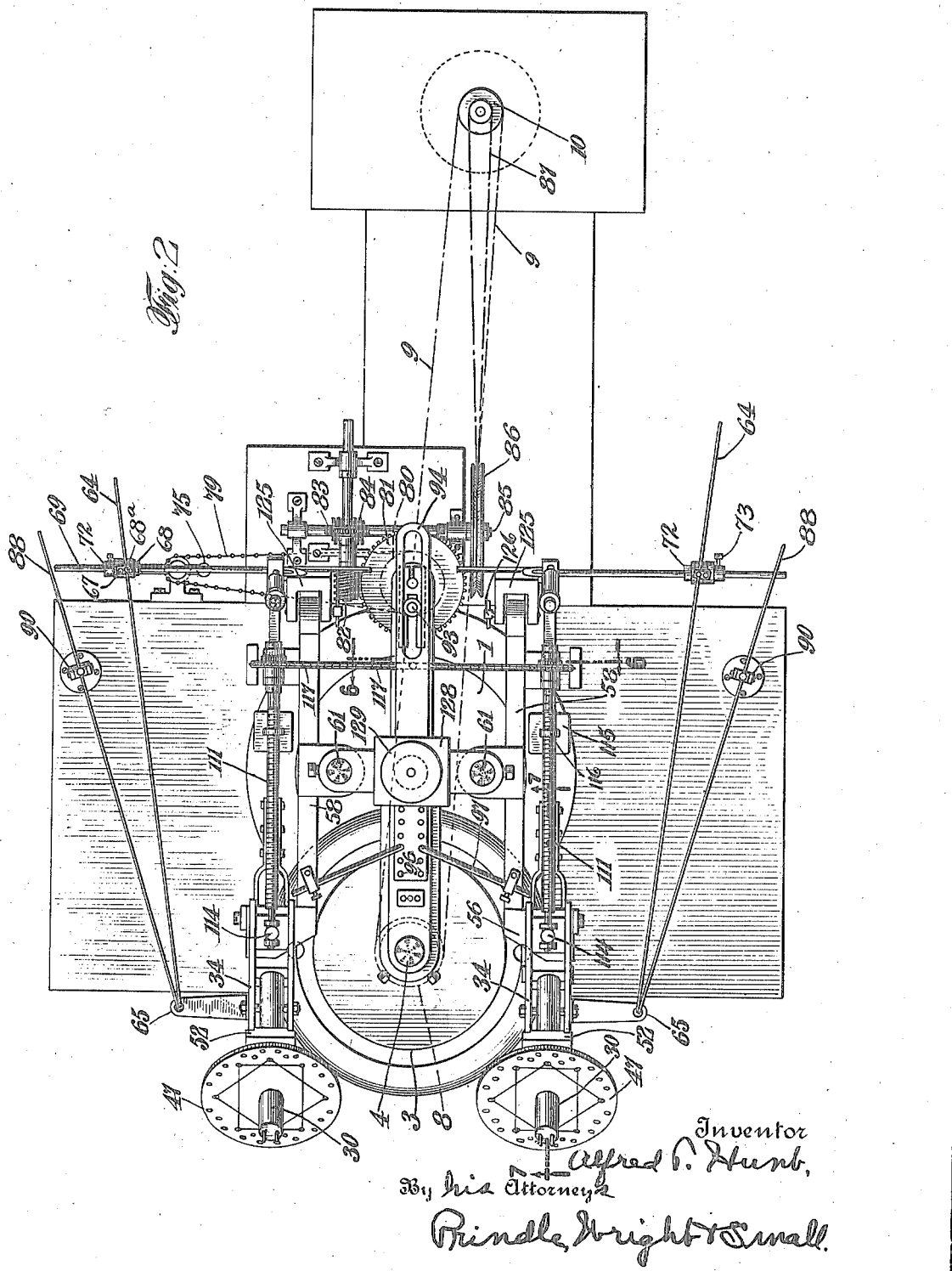

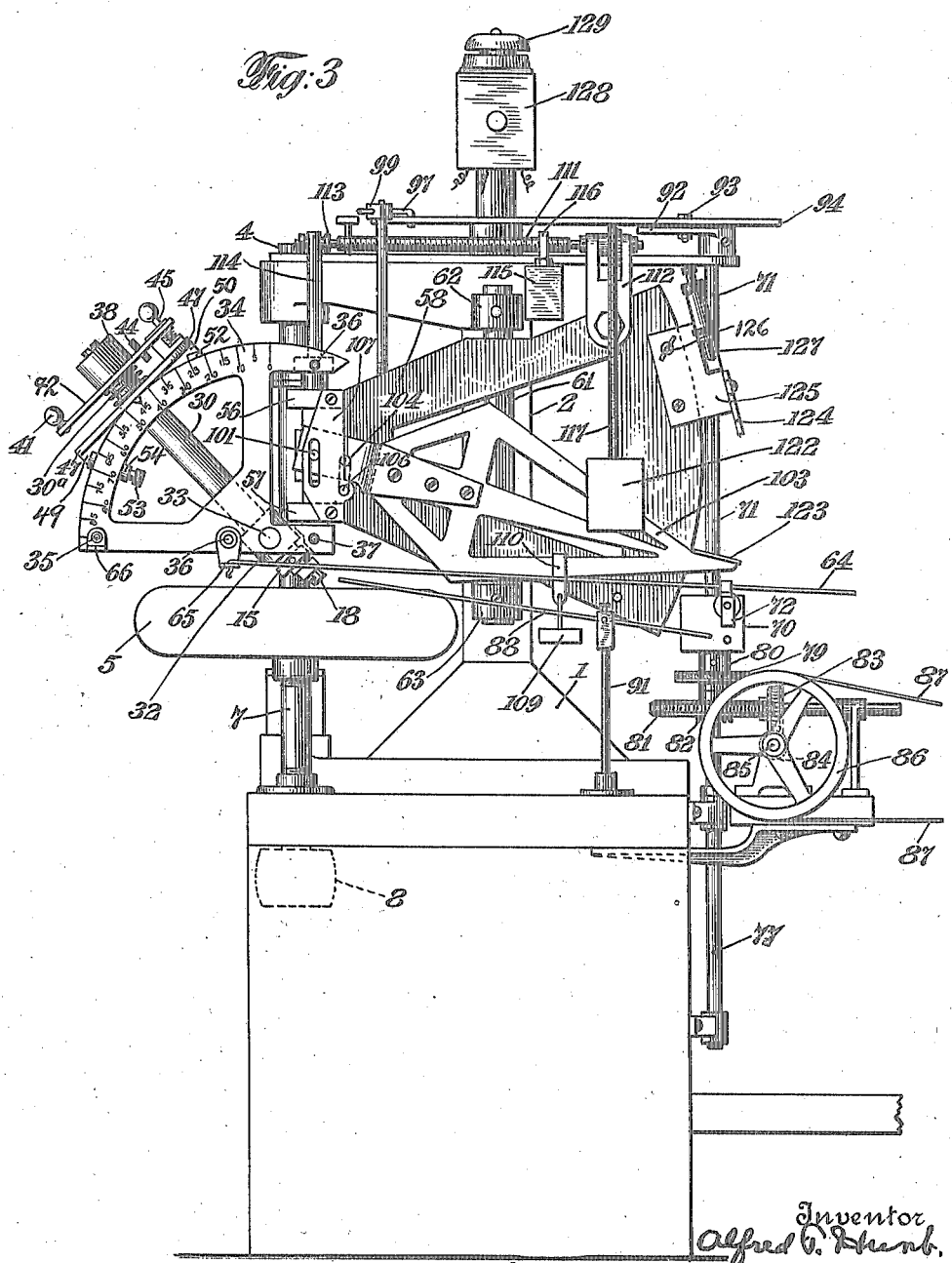

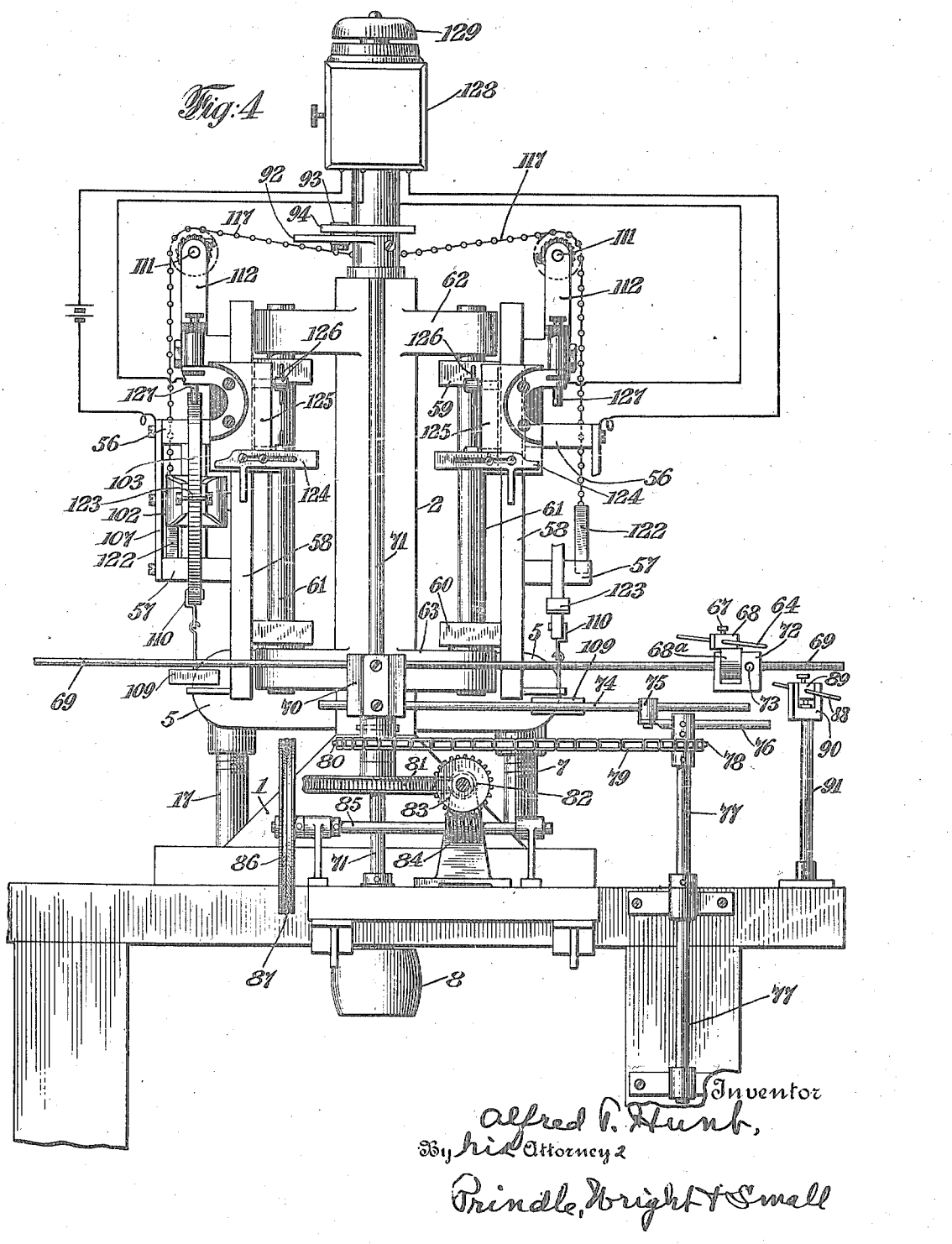

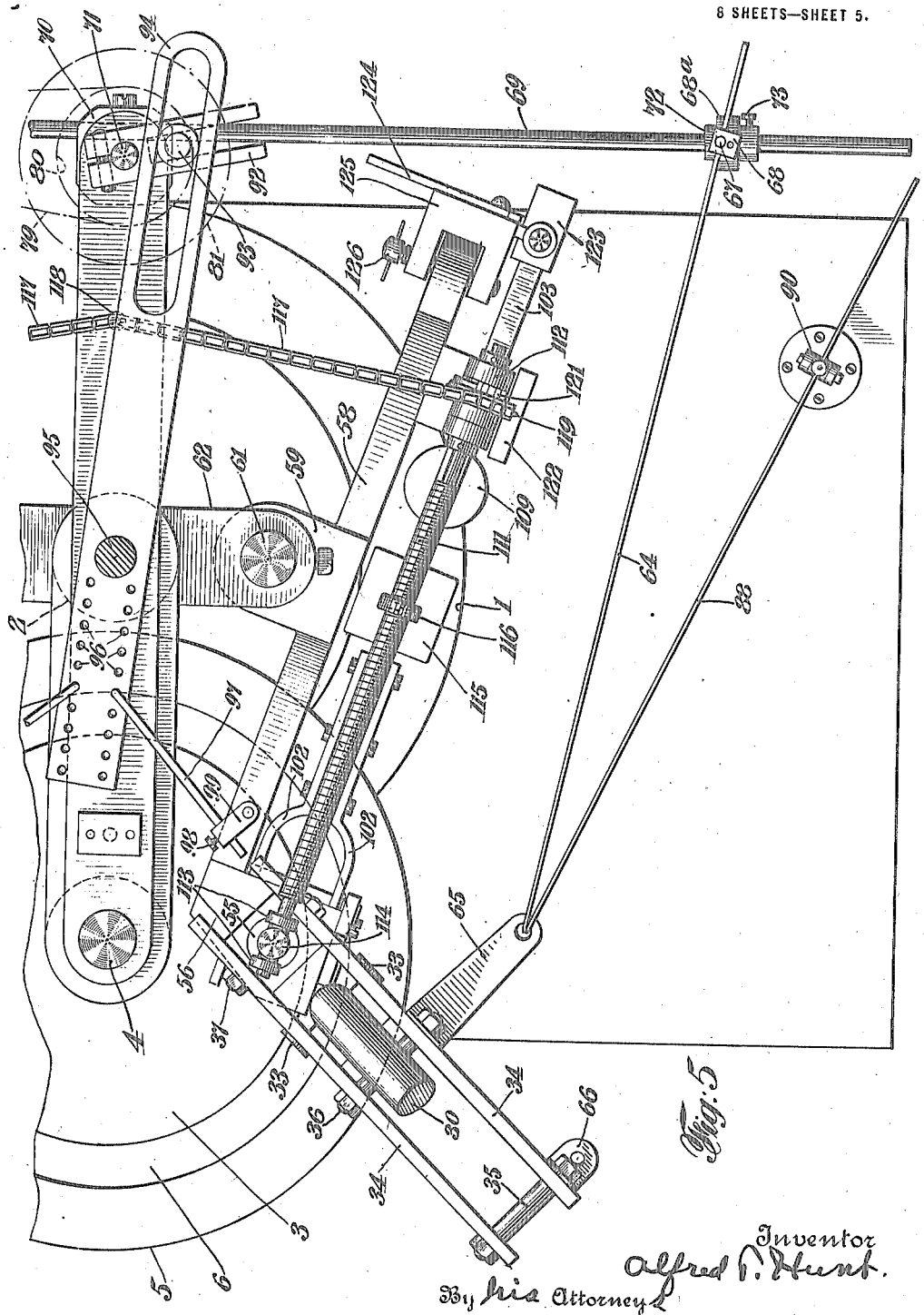

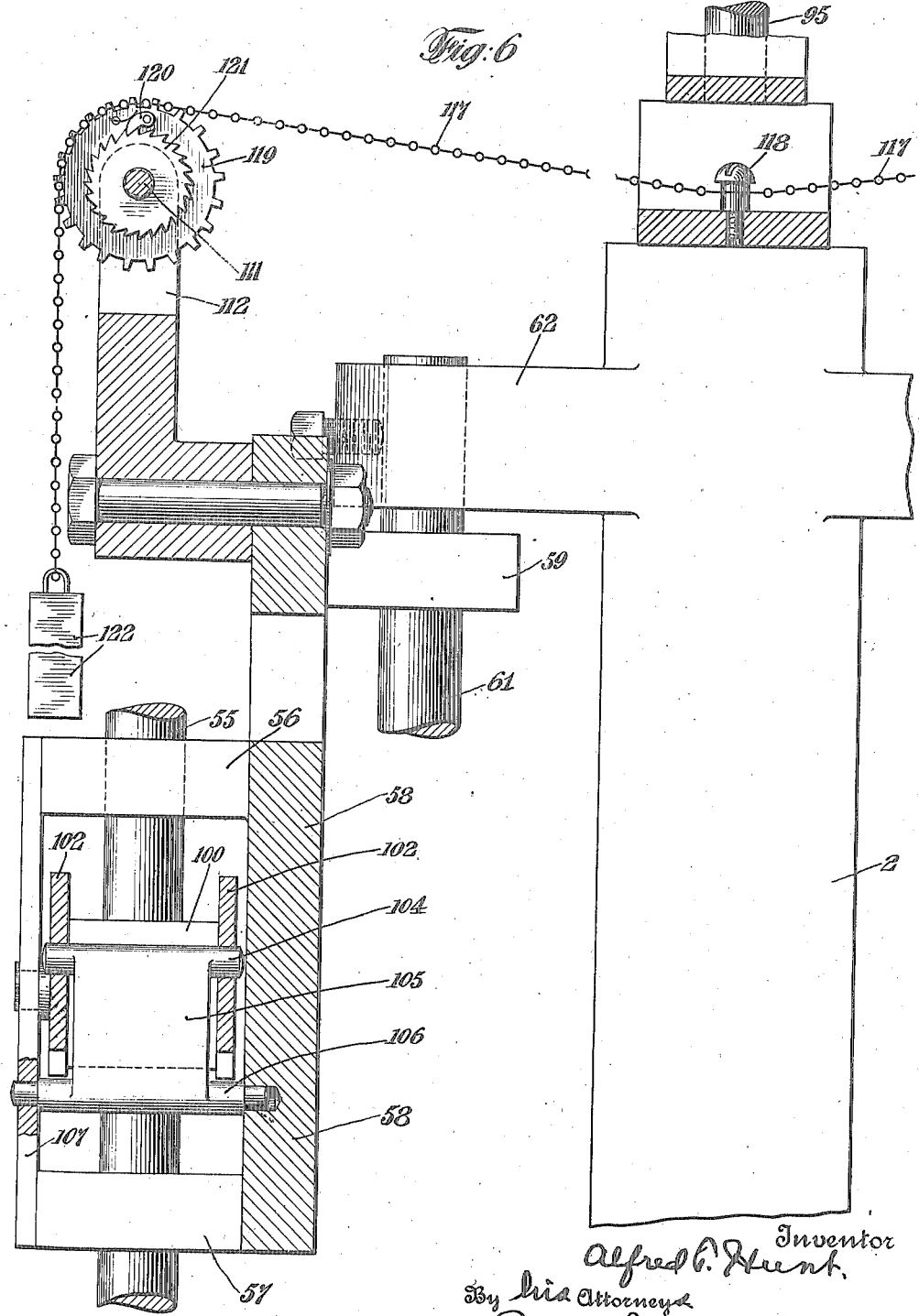

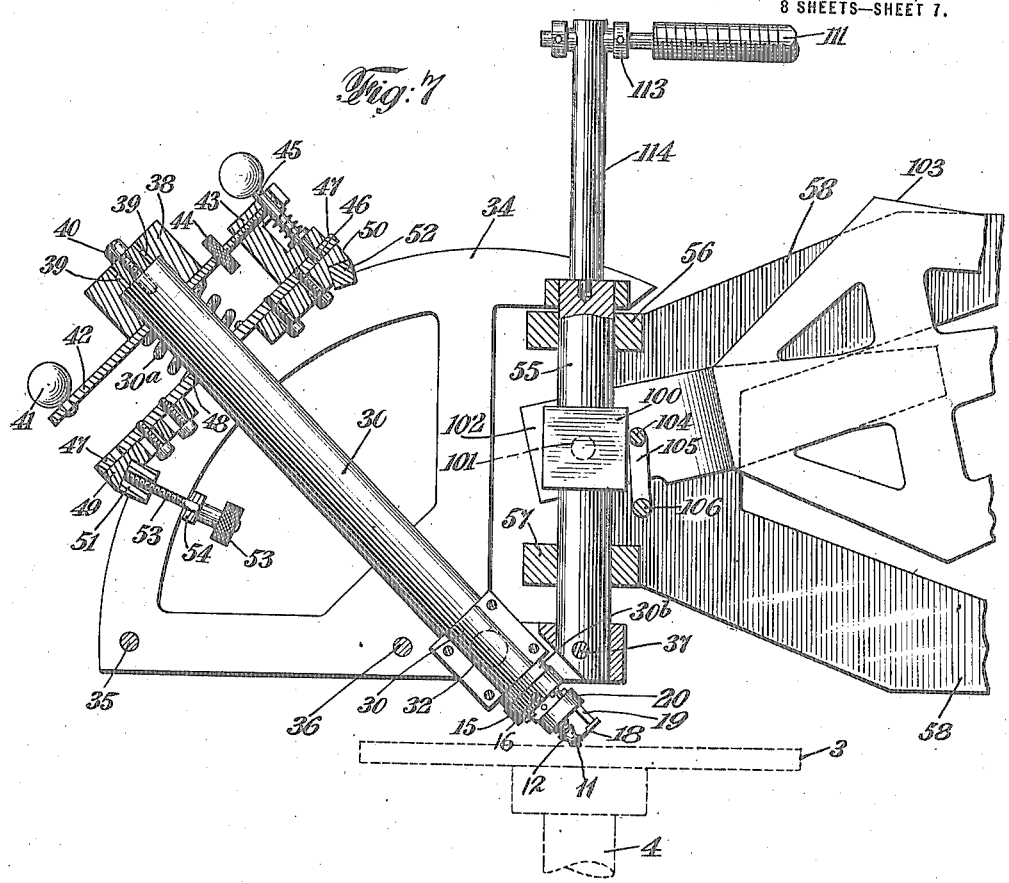
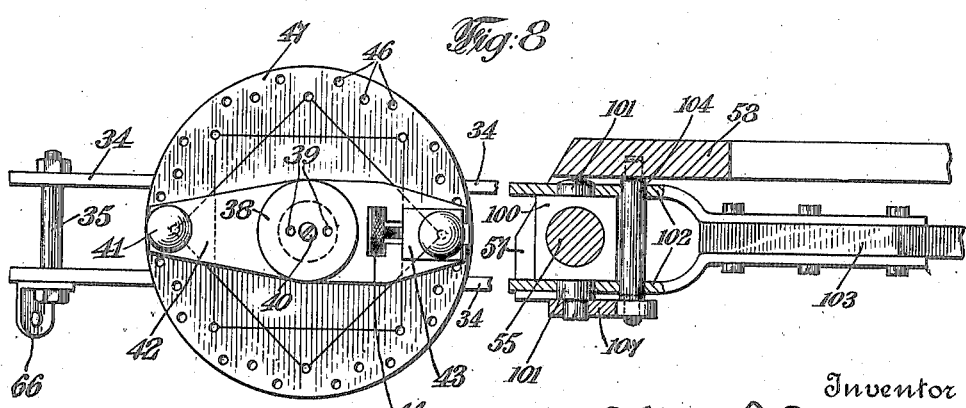

UNITED STATES PATENT OFFICE.

ALFRED T. HUNT, OF BROOKLYN, NEW YORK.

PROCESS OF AND APPARATUS FOR CUTTING DIAMONDS.

1,284,109. Specification of Letters Patent. Patented Nov. 5, 1918.

Application filed August 10, 1916. Serial No. 114,298.

*To all whom it may concern:*

Be it known that I, ALFRED T. HUNT, of Brooklyn, in the county of Kings, and in the State of New York, have invented a certain new and useful Improvement in Processes of and Apparatus for Cutting Diamonds, and do hereby declare that the following is a full, clear, and exact description thereof.

The object of my invention has been to provide a process of and apparatus for cutting diamonds which shall have, among others, the advantages of being capable of effectively cutting diamonds regardless of the direction of the grain, and of enabling a comparatively unskilled workman to accurately cut diamonds at a comparatively rapid rate, and to such ends my invention consists in the process of and apparatus for cutting diamonds hereinafter specified.

In the accompanying drawings—

Figure 1 is a front elevation of a machine embodying my invention, the parts for catching oil and diamond dust from the grinding wheel being shown in section;

Fig. 2 is a plan view of Fig. 1;

Fig. 3 is a side elevation of Fig. 1;

Fig. 4 is a rear elevation of Fig. 1;

Fig. 5 is an enlarged partial plan view showing some of the parts in a different position from that in Fig. 2;

Fig. 6 is a partial vertical sectional view on the line 6—6 of Fig. 2;

Fig. 7 is a partial vertical sectional view on the line 7—7 of Fig. 2;

Fig. 8 is a partial plan view of Fig. 7;

Fig. 9 is a vertical sectional view showing a detail of the dop or chuck and the spindle to which it is attached;

Fig. 10 is a bottom view of the chuck;

Fig. 11 is a vertical sectional view of the chuck at right angles to the plane of Fig. 9;

Fig. 12 is an end view of the spindle to which the chuck is attached;

Figs. 13 and 14 are side elevations of the device used to hold the diamond when changing the position of the dop or chuck finger, the chuck and its finger being shown in Fig. 13; and, Fig. 15 is a plan view of the said device shown in Figs. 13 and 14.

My invention is capable of embodiment in many different forms, and while I have chosen the best embodiment thereof known to me with which to illustrate it, such embodiment is to be regarded as typical only of many possible embodiments, and my invention is not to be confined thereto.

In the illustrated embodiment, a base 1 is provided which is preferably very heavy so that vibration will be avoided, as it is very desirable to have the machine run steadily, else imperfect cutting or even fracturing of the diamond might result. The said base as shown is conical at the bottom, and a column 2 rises from it to support parts which will later be described. A diamond-cutting wheel 3 is mounted on a shaft 4 having bearings in the frame, which wheel may be of any desired construction. As illustrated, the wheel is a cast iron disk, whose upper surface is charged with diamond dust mixed with olive oil, and the diamond is cut by being held in contact with the said surface of the wheel. The wheel is inclosed in a bowl 5, which, as shown in Fig. 1, forms a conduit 6 that catches the oil and diamond dust which may be thrown from the wheel by centrifugal force, or may drop therefrom, and pipes 7 open into the bottom of the said conduit to carry off and save the oil and diamond dust, thus thrown off. The wheel may be driven in any desired manner, but, as illustrated, it is driven by a belt pulley 8, a belt 9, and a pulley 10 on the power shaft.

The diamond has remarkable peculiarities which have heretofore made its working a difficult matter; for instance, the diamond cannot be cut when the cutting or abrading material moves in a certain relation to the grain of the diamond, of which there are four different systems. The positioning of the diamond relative to the direction of motion of the diamond dust on the cutting wheel has therefore, prior to my invention, been a matter requiring the highest skill in diamond cutting. I have conceived, however, that if the diamond is constantly given an oscillating movement or a movement which changes the angle of the grain to the direction of motion of the particles of diamond dust, the grain of the diamond will be presented at a proper angle to the cut during at least a portion of such oscillating motion, so that cutting will take place, and that by providing a machine which will give such a motion to the diamond, the skill of a workman heretofore required to first determine the direction of the grain in the diamond (a difficult matter), and then to so place the diamond on the wheel that the grain will have the right direction, will be made unnecessary, and a much less skilled workman can be used to cut the diamond. In addition, I have also provided a reliable and secure mechanical means for holding the diamond, and have provided readily adjustable means for so presenting the diamond to the cutting wheel that the facets can be accurately cut in the correct relation to each other, thus further eliminating the need for skill of the operative. I have also provided means for automatically regulating the pressure of the diamond on the cutting wheel, so that it shall be substantially uniform per unit area of facet, notwithstanding that the area of the facet increases as the wheel cuts away the stone. In these and other respects, my machine decreases the need of skill on the part of the operative, so as to greatly reduce the cost of cutting a diamond, and the machine being automatic during the cutting of any one facet, a single operative can cause several machines to operate simultaneously.

The diamond 11 is seated in a socket in a diamond-holder 12, the socket being made preferably to conform to the shape of the diamond by filling it with a preferably self-hardening cement 13. The holder has a stem 14 which is held in a hole passing through a base 15 by sets of screws at two different levels, there being preferably four screws 16 on the upper set and four screws 17 on the lower set, and (the hole in the holder being larger than the stem) by adjusting the various screws, the shank may be made to tip relative to the base, and thus the relation of the diamond to the axis of the base can be changed laterally so as to position the center of the stone in the axis of the base, even though the center may not be in the axis of the shank. If the stone is irregular in shape or if it is not placed in the holder symmetrically to the axis of the latter, such an adjustment is desirable and enables a larger finished diamond to be made from a given rough diamond than would otherwise be possible.

In order to assist in holding the diamond in its socket on the holder, I provide a finger 18 which is preferably forked, and which has a shank 19 that is adjustably secured in a hole in the block 20, by a screw 21, the block, in the instance shown, being mounted on the stem of the holder. When the facets have been cut on one side of the diamond 11ª (see Figs. 9, 10, 11 and 13), it is desirable to shift the finger to that side of the diamond so as to expose the portion 11ᵇ which has been covered by the finger and which, therefore, has not been cut. At the same time, it is desirable not to relieve the diamond from pressure, as it might otherwise loosen in its socket and not go back to the same position.

I have therefore provided a device, as shown in Figs. 13, 14 and 15, for applying pressure to the diamond before releasing the finger and for maintaining such pressure while the finger is shifted to a new position. The said device, which I shall call a clamp, consists of a frame 22 having a bifurcated ledge 23, which is adapted to be received in a groove 24 on the dop head by a lateral movement, and there is a screw 25 mounted in the frame which can be brought to bear upon the culet, or base, of the diamond, or upon the table, or top, of the diamond to force the diamond down in its seat. I prefer, as illustrated, to provide a screw with a head 26, which is swiveled in the screw, and which also has a bearing in a bracket 27 to steady it. The head being swiveled, does not turn with the screw after it engages the diamond, and therefore relieves the diamond from strain which it would otherwise have to bear.

The base 15 preferably has a circular rib or ledge 28 which engages a shoulder 29 on a spindle 30, the base being secured to the spindle as by screws 31. Thus, in the form shown, the base is always concentric to the spindle when secured thereto and if it be removed for any reason and put back again, it will always occupy the same relation to the spindle.

The lower end of the spindle 30 is mounted in a bearing 32, which is mounted on trunnions 33 that have bearings in two sectors 34 which are spaced apart but held in fixed relation to each other as by bolts 35, 36 and 37. The upper end of the spindle 30 is fixedly secured in a block 38, as by dowel pins 39, engaging the said parts to prevent relative rotation, and a screw 40 holds the parts together. A handle 41 is mounted upon a plate 42, which is secured to the block 38 so that the rotation of the handle will rotate the spindle. The opposite end of the said plate has a block 43 mounted in a guideway formed in the plate 42 and adjustable therein by means of a screw 44. The block 43 carries a spring-pressed bolt 45 which is adapted to enter any one of a number of holes 46 formed in a plate 47, the said holes being so arranged in the plate that engagement of the bolt 45 therewith will position the diamond for the cutting of one of a particular series of facets. The plate 47 has a bearing 48 for the spindle 30, and is adjustably mounted on the curved edges of the sectors 34, as by blocks 49 and 50, which are preferably adjustably fastened to said plate, as by screws passing through holes in the said blocks that are larger than said screws. The block 49 has secured to it a cross-bar 51 that has a curved surface fitting upon the edges of the sectors, and the block 50 has a similar cross-bar 52. A thumb screw 53 passes through a bar 54 that engages the inside edge of the sectors and said screw is threaded into the bar 51, and by means of the said screw, the bars 51 and 54 may be clamped on the sectors, and thus the spindle 30 may be secured at any vertical angle to the polishing wheel, so as to form a facet at the desired angle. By changing the engagement of the bolt 45 successively with each hole 46 of one circular series of holes in the plate 47, the diamond may be presented to the cutting wheel to form each separate facet of one series. A spring $30^a$ is interposed between the plate 47 and the plate 42, so as to hold a shoulder $30^b$ on the spindle 30 firmly against its bearing, and thus to prevent any looseness or shake endwise of this spindle. The plate 47 is preferably provided with as many series of rings of holes as there are bands of facets to be formed on the diamond.

In order to be able to cause the diamond to rise from and approach the cutting wheel, I have secured the sectors 34 to the upper and lower ends of a vertical stub shaft 55, which latter is mounted in bearings formed in arms 56 and 57 that are parts of a bracket 58 carrying arms 59 and 60, which latter are journaled on a vertical shaft 61 so that the bracket can swing thereon. The shaft 61 is fixedly mounted on the frame as by being secured in lugs 62 and 63, which are respectively formed on the column 2.

The machine which I have illustrated is adapted to cut two diamonds at a time on a single cutting wheel, and it therefore has two independent sets of diamond-holding parts which are symmetrically arranged in the machine. As these sets of parts are alike, I shall only describe the construction of a set on one side of the machine.

It will be seen that the sectors and parts attached thereto and the diamond carried thereby, can be swung horizontally about the axis of the shaft 55, such swinging movement being the movement before mentioned to change the horizontal angular relation of the grain in the face being cut with the direction of motion of the particles of diamond dust on the cutting wheel.

In order to swing the sectors and diamond-holding parts horizontally about the axis of the shaft 55, I provide a rod 64 which, at its forward end, is adapted to engage either one of two brackets 65 and 66 that are fastened to one of the said sectors, and at its rearward end is adapted to be adjustably clamped, as by a screw 67 in a block 68, which block is pivoted on a block $68^a$ on a rod 69, and the latter block is adapted to be swung horizontally by the oscillation of a block 70 on a vertical shaft 71 by which the said rod is carried, the radial distance of the block $68^a$ from the shaft 71 (and therefore the amount of swing given to the sectors 34) being controlled by a block 72 which has a slot in which the block $68^a$ is received, and which is adapted to be adjustably secured upon the rod 69 by a screw 73. The block 70 also carries a rod 74 which passes freely through a crank pin 75 that is pivoted on a rod 76, which latter is adjustably mounted on a continuously rotating shaft 77. The radial distance of the crank pin 75 from the shaft 77 can be adjusted by adjusting the rod 76. The shaft 77 is rotated by a sprocket wheel 78 which is driven by a sprocket chain 79 that engages a sprocket wheel 80 on the shaft 71, the latter being rotated by a worm wheel 81 through a worm 82. The worm 82 is driven by a worm wheel 83 through a worm 84 carried by a shaft 85 that has a belt pulley 86 driven by a belt 87 from the power shaft. In order to hold the sectors (and therefore the diamond) from operation when desired, I provide a rod 88 which is adapted to hook into one of the brackets 65 or 66 and to be clamped in a block 89 held in a yoke 90 in the upper end of a post 91. When the rod 88 is clamped fast, the rod 64 must be free to slide through the block 68, and vice versa.

The frame 58, as is seen in Figs. 2 and 5, is in the form of a lever fulcrumed at about its mid-length on the shaft 61, in the present instance, and means are provided for swinging the said frame on the said fulcrum, as follows:

At the upper end of the shaft 71 is a crank 92 having a crank pin 93 adjustably mounted as in the slot in the said crank, which crank pin engages a slot in a lever 94 that is fulcrumed on the said shaft that has a fulcrum 95 mounted on the upright 2. The forward end of the lever 94 has a series of holes 96 and a rod 97 is provided to engage one of the said holes and to be clamped by a screw 98 in a block 99 that is pivoted on the frame 58, so that the swinging of the lever will swing the said frame and with it the sectors 34 and the diamond carrying parts. There is a series of holes 96 so that the amount of motion transmitted to the frame 58 may be regulated.

In order to raise and lower the diamond from the cutting wheel, and to regulate its pressure upon the cutting wheel, the following arrangement is provided:

A block 100 (Figs. 6 and 7) is fixed on the shaft 55, and this block is pivoted by pins 101 to forked plates 102 that, with a frame 103, form a lever. The lever carries a pin 104 which is formed integral with the link 105 that is pivoted on a pin 106, at one end in a plate 107, and at the other end in the frame 58. Thus the lever formed by the plates 102 and the frame 103, when rocked upon its swinging fulcrum 104, raises and lowers the pins or trunnions 101 and thus raises and lowers the shaft 55, the segments 34, which are attached to them, and the diamond-holding parts. A weight 109 is hung by a strap 110 from the frame 103 so that it can be shifted away from the fulcrum of said frame, to hold the diamond up away from the cutting wheel while, for instance, the dop base is being fastened to the spindle 30, or it can be shifted toward the fulcrum so as to allow the weight of the parts to cause the diamond to descend against the cutting wheel.

In order to provide a controllable pressure to force the diamond against the cutting wheel, so that the pressure per unit of surface of the facet being cut may be increased as the area of the facet increases with the cutting, the following arrangement is provided:

A screw shaft 111 is journaled at its rear end in a bracket 112 that may be pivoted upon the frame 58 and at its other end is journaled in a bearing 113 carried by the upper end of a rod 114 that is mounted upon the shaft 55, which carries the sectors 34 and the diamond-holding parts. A weight 115 is hung from a strap 116 that is threaded to engage the screw shaft 111, and the position of the said weight on the said screw shaft determines the amount of pressure that is exerted by the diamond against the cutting wheel. The weight 115 can be detached from the shaft 111 and the rod 114 lifted out of its socket in shaft 55, and the screw shaft can be swung out of the way so that the diamond carrying spindle can be swung into a vertical position to cut the top or bottom facets of the diamond, known as the "table" and "culet", respectively. The weight 111 is progressively shifted along the screw shaft (so as to increase the pressure of the diamond as the area is increased by the cutting), by a sprocket chain 117 which is fastened as by a screw 118, to a stationary part, the sprocket chain passing over a sprocket wheel 119, loosely mounted on the screw shaft, and carrying a pawl 120 that engages a ratchet wheel 121 fast on the said shaft. The sprocket chain is kept taut by a weight 122 hung upon its free end. As the frame 58 is oscillated by the rotation of the crank pin 93, as before described, the sprocket chain causes the sprocket wheel to oscillate, and thus causes the pawl to turn the ratchet wheel 121 step by step, rotating the screw shaft and causing the weight 115 to travel in the direction of the diamond as before described.

To prevent the diamond-holding parts from accidentally descending unintentionally and striking the stone against the grinding wheel, I provide the rear end of the frame 58 with a projection which, in the present instance, is in the form of a plate 123, and a stop 124 is adjustably mounted, as by screws passing through a slot in the said stop, on a block 125 that can be clamped at any desired point on the arc-shaped rear end of the frame 58 by a thumb screw 126. The stop 124 may be shifted into and out of the range of movement of the plate 123 according as it is desired to use it or not.

In order to regulate the depth to which the facet is cut, and at the same time signal to the operative that the cutting of the facet has been completed, I provide an electric contact 127 which is adapted, when touched by the plate 123 to complete a circuit that will operate a signal 128 on the top of the machine, ringing an audible signal 129 to call attention to it, and throwing an arrow 130 or other visible sign in a position to indicate upon which side of the machine the facet is completed. The stop 127 is adjustable so that it not only acts as an electric contact but as a stop to limit the movement of the frame 58, regardless of any further movement of the weight 115, and to positively prevent grinding the facet farther toward the axis of the diamond than is desired.

My process of cutting diamonds as practised by the machine which I have described, has, in addition to the advantages before mentioned, the following advantages:

In the cutting of diamonds as practised before my invention, the diamond has been stationary while engaging the cutting wheel, and the result has been that it has worn a groove in the wheel at the point of contact. As my diamond is swung back and forth across the face of the wheel by the swinging of the frame 58, the wheel is worn uniformly and maintains its plane surface for a much longer time.

As the one lever 94 swings both frames 58, and therefore keeps them approximately parallel, the diamond on one side of the machine is at the inner portion of its travel across the face of the wheel when the diamond on the other side of the machine is at the outer portion of such travel, and the result is that the heating effect of the stones on the wheel is not applied to the same part at the same time, and the wheel is kept cooler than it otherwise would be.

I claim:

1. The process of cutting diamonds comprising holding two diamonds against a cutting wheel, moving said diamonds radially of the wheel while cutting them, said radial motions being in opposite directions relative to the center of the wheel.

2. The process of cutting diamonds comprising holding two diamonds against a cutting wheel, moving said diamonds radially of the wheel while cutting them, said radial motions being in opposite directions relative to the center of the wheel, and changing the angle of the grain of the diamonds to the motion of the particles cutting the respective diamonds.

3. In a diamond cutting machine, the combination of a diamond cutting wheel, a diamond-holding dop or chuck, means to rotate said dop or chuck about an axis perpendicular to said wheel, and means for increasingly applying pressure to said dop or chuck during the cutting operation.

4. In a diamond cutting machine, the combination of a diamond cutting wheel, a diamond-holding dop or chuck, automatic means to rotate said dop or chuck about an axis perpendicular to said wheel, and means for increasingly applying pressure to said dop or chuck during the cutting operation.

5. In a diamond cutting machine, the combination of a cutting wheel, a shaft perpendicular to said wheel, a diamond-holding dop or chuck, means for supporting said dop or chuck from said shaft, means for adjusting the angle in a vertical plane formed between said dop or chuck and said shaft and means for moving said shaft away from said wheel.

6. In a diamond cutting machine, the combination of a cutting wheel, a shaft perpendicular to said wheel, a diamond holding dop or chuck, means for supporting said dop or chuck from said shaft, means for adjusting the angle in a vertical plane formed between said dop or chuck and said shaft, and means for swinging said dop of chuck about the axis of said shaft during the cutting operation.

7. In a diamond cutting machine, the combination of a cutting wheel, a shaft perpendicular to said wheel, a dop or chuck, a spindle upon which said dop or chuck is mounted, a frame pivoted to said shaft, and having bearings for said spindle, and means for adjusting the angle which said spindle makes with said shaft.

8. In a diamond cutting machine, the combination of a cutting wheel, a shaft perpendicular to said wheel, a dop or chuck, a spindle upon which said dop or chuck is mounted, a frame carried by said shaft, and having bearings for said spindle, means for adjusting the angle which said spindle makes with said shaft, and means for swinging said frame about said shaft.

9. In a diamond cutting machine, the combination of a cutting wheel, a shaft perpendicular to said wheel, a dop or chuck, a spindle upon which said dop or chuck is mounted, a frame carrying said shaft, means for adjusting the angle which said spindle makes with said shaft, means for swinging said frame about said shaft, and means for rotating said spindle upon its own axis.

10. In a diamond cutting machine, the combination of a cutting wheel, a shaft substantially perpendicular to said cutting wheel, a frame carried by said shaft, a spindle mounted on a horizontal axis on said frame, a dop or chuck carried by said spindle, and means for adjusting said spindle in said frame about said horizontal axis.

11. In a diamond cutting machine, the combination of a cutting wheel, a shaft substantially perpendicular to said cutting wheel, a frame carried by said shaft, a spindle mounted on a horizontal axis on said frame, a dop or chuck carried by said spindle, means for adjusting said spindle in said frame about said horizontal axis, and means for swinging said frame on said shaft during the cutting operation.

12. In a diamond cutting machine, the combination of a diamond cutting wheel, a shaft perpendicular to said wheel, a frame carried by said shaft, a dop or chuck carried by said frame, means for swinging said frame about said shaft, and means for moving said shaft radially of said wheel.

13. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, and means for raising and lowering it toward and from the wheel.

14. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, and means for adjusting said spindle about its axis.

15. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, and means for adjusting said spindle about the axis upon which it is pivoted.

16. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about its axis, and means for moving said shaft toward and from the center of said wheel.

17. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about the axis upon which it is pivoted, and means for moving said shaft toward and from the center of said wheel.

18. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about its axis, and means for applying a progressively greater pressure to the diamond as the cutting increases.

19. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about the axis upon which it is pivoted, and means for applying a progressively greater pressure to the diamond as the cutting increases.

20. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about its axis, means for moving said shaft toward and from the center of said wheel, and means for applying a progressively greater pressure to the diamond as the cutting increases.

21. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about the axis upon which it is pivoted, means for moving said shaft toward and from the center of said wheel, and means for applying a progressively greater pressure to the diamond as the cutting increases.

22. In a diamond cutting machine, the combination of a diamond cutting wheel, a shaft perpendicular to said wheel, a frame carried by said shaft, a spindle pivoted to said frame on a horizontal axis, a dop or chuck carried by said spindle, means for swinging said frame, means for raising and lowering it toward and from the wheel, means for adjusting said spindle about the axis upon which it is pivoted, means for moving said shaft toward and from the center of said wheel, and means for applying a progressively greater pressure to the diamond as the cutting increases, said last mentioned means comprising a horizontal screw shaft supported at one end by said vertical shaft, a weight mounted on said screw shaft, and means for rotating said shaft as the cutting progresses to cause said weight to travel toward said vertical shaft.

23. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, and means for swinging said frame to move said shaft radially of said wheel, and a lever connecting said shaft with said pivoted frame, whereby said shaft and its attached diamond-supporting parts may be moved toward and from said wheel.

24. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, means for swinging said frame to move said shaft radially of said wheel, a lever connecting said shaft with said pivoted frame, whereby said shaft and its attached diamond-supporting parts may be moved toward and from said wheel, and means for holding said lever down to prevent the diamond accidentally striking the wheel.

25. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, means for swinging said frame to move said shaft radially of said wheel, a lever connecting said shaft with said pivoted frame, whereby said shaft and its attached diamond-supporting parts may be moved toward and from said wheel, and means for holding said lever down to prevent the diamond accidentally striking the wheel, said last mentioned means comprising a stop adjustable into and out of the path of movement of said lever.

26. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, means for swinging said frame to move said shaft radially of said wheel, a lever connecting said shaft with said pivoted frame, whereby said shaft and its attached diamond-supporting parts may be moved toward and from said wheel, and means for holding said lever down to prevent the diamond accidentally striking the wheel, said means comprising a weight adjustably mounted on said lever.

27. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, and means for swinging said frame to move said shaft radially of said wheel, a lever connecting said shaft with said pivoted frame, whereby said shaft and its attached diamond-supporting parts may be moved toward and from said wheel, and a stop to limit the movement of said lever and to regulate the depth of cut on the stone.

28. In a diamond cutting machine, the combination of a diamond cutting wheel, a shaft perpendicular to said wheel, a frame supported by said shaft, a spindle mounted in said frame on a horizontal axis, a dop or chuck carried by said spindle, means for adjusting said spindle about said axis, a pivoted frame in which said shaft is mounted, means for swinging said frame to move said shaft radially of said wheel, a lever connecting said shaft with said pivoted frame, whereby said shaft and its attached diamond-supporting parts may be moved toward and from said wheel, a stop to limit the movement of said lever and to regulate the depth of cut on the stone, and means connected with said stop for signaling an operative to indicate the completion of a facet.

29. In a diamond cutting machine, the combination of a cutting wheel, a spindle having a diamond holding dop or chuck thereon, said spindle having a shoulder adapted to engage a bearing, and a spring adapted to hold said shoulder against said bearing to prevent looseness.

30. A diamond-holding dop or chuck comprising a holder having a stem, a base having a hole larger than said stem, and sets of screws at different levels in said base to permit adjustment of said stem in said base.

31. In a diamond cutting machine, in combination with a cutting wheel, a movably supported bracket, a frame pivotally supported from said bracket, an adjustable dop holding device carried by said frame, means for moving said bracket, and means for swinging said frame.

32. In a diamond cutting machine, a cutting wheel, a pivoted bracket, means for swinging said bracket, and a dop holding device supported from said bracket.

33. In a diamond cutting machine, a cuting wheel, a pivoted bracket, means for swinging said bracket, a dop holding device, and means supporting said dop holding device upon said bracket so as to permit movement of said device to and from the wheel.

In testimony that I claim the foregoing I have hereunto set my hand.

ALFRED T. HUNT.

Witnesses:
 EDWIN J. PRINDLE,
 J. FRENDENVOLL.